W. B. CLIFFORD.
AUXILIARY AIR VALVE FOR INTERNAL COMBUSTION ENGINES.
APPLICATION FILED JUNE 5, 1918.

1,434,282.

Patented Oct. 31, 1922.

Inventor.
Walter B. Clifford
by Heard Smith & Tennant.
Attys.

Patented Oct. 31, 1922.

1,434,282

UNITED STATES PATENT OFFICE.

WALTER B. CLIFFORD, OF FITCHBURG, MASSACHUSETTS.

AUXILIARY AIR VALVE FOR INTERNAL-COMBUSTION ENGINES.

Application filed June 5, 1918. Serial No. 238,246.

*To all whom it may concern:*

Be it known that I, WALTER B. CLIFFORD, a citizen of the United States, residing at Fitchburg, county of Worcester, State of Massachusetts, have invented an Improvement in Auxiliary Air Valves for Internal-Combustion Engines of which the following description, in connection with the accompanying drawing, is a specification, like characters on the drawing representing like parts.

This invention relates to an auxiliary air valve device adapted to be used in connection with internal combustion engines for the purpose of admitting additional air to the intake manifold, and the object of the invention is to provide a novel valve device which operates to admit an increased amount of air as a larger amount of gas is being consumed, and a decreased amount of air as the amount of gas consumed is decreased. This is accomplished by providing means whereby the amount of auxiliary air supplied is inversely proportional to the degree of vacuum in the intake manifold to which the device is attached.

Various devices have heretofore been proposed for admitting additional air to the intake manifold of an internal combustion engine, but most of these devices, so far as I am aware, have comprised an air valve which is normally held closed by a spring but is opened by the suction developed in the intake manifold. Devices of this nature operate to admit an amount of air which is proportionate to the suction or vacuum developed in the intake manifold, rather than to the amount of gas which is being consumed. In the operation of internal combustion engines, the vacuum or suction in the intake manifold is the greatest when the throttle is substantially closed, and it decreases as the throttle opens. The reason for this is that so long as the engine is running it is developing suction at the delivery end of the intake manifold, and when the throttle is closed so that very little air can be admitted to the throttle end of the manifold, the continued sucking of the engine will create a considerable vacuum in the intake manifold, while when the throttle is open to allow air or gas to enter the manifold freely the vacuum will be correspondingly reduced. Hence with the type of valve above referred to which is opened by the suction, it will follow that when the engine is idling the air valve will be opened widest, while when the throttle is open and the vacuum in the inlet manifold is correspondingly reduced, the air inlet valve will tend to close. Such an air valve does not operate in the most efficient manner because in order to increase the efficiency of an internal combustion engine, it is desirable to increase the amount of auxiliary air which is introduced when the throttle is open and the engine is consuming considerable gas, and to decrease the amount of auxiliary air when the engine is idling and is consuming very little gas.

My improved auxiliary air valve is designed so that an increased suction or vacuum in the intake manifold will tend to close the valve and a decreased vacuum or suction will allow the valve to open more or less. I accomplish this result by providing an air valve which is acted upon by a spring or its equivalent which tends normally to open the valve thereby to admit air to the inlet manifold on the delivery side of the throttle, and by also providing means which are influenced by the suction or vacuum in the intake manifold which tend to close the valve as the suction increases. A device embodying my invention, therefore, will admit a greater amount of air to the manifold when the throttle is open than when the throttle is closed, the amount of air being proportionate to the amount of gas which is being consumed.

In order to give an understanding of my invention, I have illustrated in the drawings a selected embodiment thereof which will now be described, after which the novel features will be pointed out in the appended claim.

Figure 1:
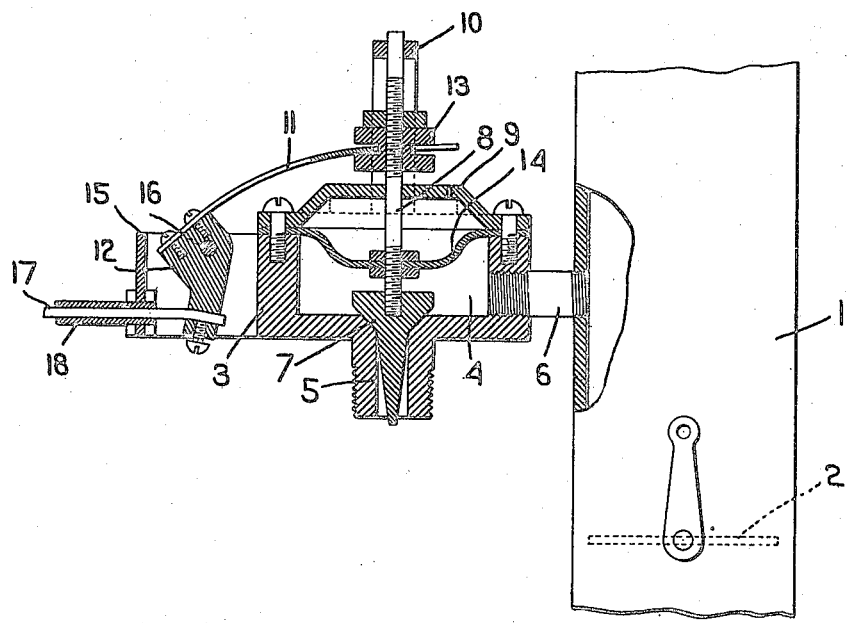
Fig. 1 is a sectional view through a valve embodying my invention.
Figure 2:
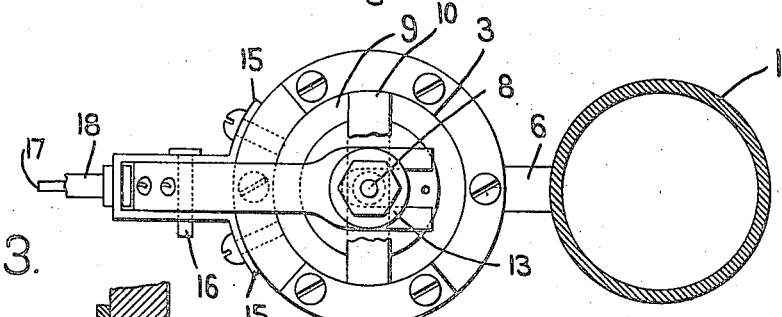
Fig. 2 is a top plan view.

In the drawings 1 indicates a portion of the inlet manifold of an internal combustion engine, and 2 indicates the usual throttle valve therein. The upper end of the inlet manifold 1 is supposed to lead to the engine, and the lower end leads to the carbureter, not shown.

My improved valve device comprises a valve casing 3 having a valve chamber 4 therein which is provided with an air inlet port 5 and also with an outlet opening that communicates with the manifold 1 between the throttle valve 2 and the engine. It is convenient to connect the valve casing 3 to the intake manifold by means of the short pipe or nipple 6 which constitutes the communication between the valve chamber 4 and said manifold. The inlet port 5 is controlled by an air valve 7 which is acted upon by a spring or other suitable device that tends normally to open the valve and which is also arranged so that the suction in the intake manifold will tend to close it. While various constructions might be employed to secure these ends I have herein shown the valve as provided with a stem 8 which extends through and is guided by both a cover plate 9 for the valve chamber 4 and a bridge piece 10 and which is acted upon by a flat spring 11 that tends normally to open the valve. The spring 11 is shown as secured at one end to a block or support 12 and the other end is forked and embraces a grooved nut 13 which is screw-threaded to the valve stem 8, thus allowing of adjustment to vary the tension of the spring. The resiliency of the spring 11 thus tends to raise the valve 7 from its seat. The valve stem 8 also extends through and is secured to a flexible diaphragm 14 which extends across the chamber 4 and the edge of which is clamped between the valve casing and the cover plate 9. The chamber 4 thus has a flexible top which is secured to the valve stem. The suction or vacuum developed in the manifold 1 between the throttle-valve and the engine will thus act on the diaphragm 14 and tend to draw the valve 7 downwardly. The spring will preferably be so constructed that when the engine is idling and the maximum vacuum is produced in the inlet manifold, the suction on the diaphragm 14 will be sufficient to overcome the resiliency of the spring 11 and close the inlet valve, as shown in Fig. 1, while as the vacuum in the inlet manifold decreases due to opening of the throttle valve the correspondingly-decreased suction on the diaphragm 14 will permit the spring 11 to open the valve 7 more or less. The valve 7 will thus be open to its maximum amount when the vacuum in the intake manifold is at a minimum and will be closed when the vacuum in the intake manifold is at a maximum. The degree of opening of the inlet valve is thus proportionate to the amount of vacuum or suction in the inlet manifold and this in turn corresponds to the amount which the throttle valve is opened and the amount of gas which is being used.

With my invention, therefore, the amount of air which is admitted will be proportionate to the amount of gas which is being used, so that the engine will be operating most effectively under all conditions.

Figure 3:
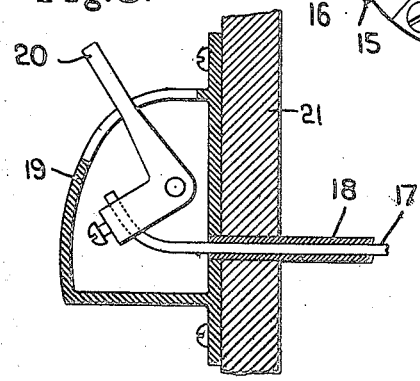
Fig. 3 is a view showing the dash control for adjusting the valve.

I may if desired provide means whereby the valve spring 11 may be adjusted while the engine is in operation, and I will preferably accomplish this by a spring-adjusting means leading to the dash-board or instrument-board, thus providing a dash-control for the valve. One simple way of securing this end is to pivot the block 12 at 16 to a bracket or support 15 carried by the valve casing 3, and to connect the block 12 to a suitable dash-control device by means of a wire 17 or other flexible connection. I have herein shown a construction wherein the wire 17 extends through and slides in a protecting sheath or tube 18, said wire and sheath leading from the valve to a control device secured to the dash. A suitable control device is shown in Fig. 3, and it comprises a casing or housing 19 secured to the dash 21 and to which the sheath 18 leads, and a control lever 20 pivoted in the housing and to which the end of the wire 17 is connected. By swinging the lever 20 the wire 17 will be moved longitudinally of the sheath 18 and will thus turn the block 12 thereby to increase or decrease the resiliency of the spring 11. The friction of the wire 17 in the flexible sheath 18 is sufficient to hold the block 12 in any adjusted position.

I claim:

In an auxiliary air valve for internal combustion engines the combination with the intake manifold of such an engine and a throttle valve therein, of a chamber in free communication with said manifold between the throttle and the engine, said chamber having a flexible wall and an air inlet opening, an inwardly opening air valve controlling said air inlet opening, a valve stem connected to said valve and also connected to said flexible wall, a rocking member, a spring arm connected thereto and acting on the valve stem with a tendency to open the valve, and means remote from the valve for controlling the position of said rocking member and thus adjusting the tension of the spring.

In testimony whereof, I have signed my name to this specification.

WALTER B. CLIFFORD.